(12) United States Patent
Gristede et al.

(10) Patent No.: US 9,529,951 B2
(45) Date of Patent: Dec. 27, 2016

(54) SYNTHESIS TUNING SYSTEM FOR VLSI DESIGN OPTIMIZATION

(71) Applicant: International Business Machines Corporation, Armonk, NY (US)

(72) Inventors: George D. Gristede, Katonah, NY (US); Matthew M. Ziegler, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 14/290,886

(22) Filed: May 29, 2014

(65) Prior Publication Data
US 2015/0347641 A1    Dec. 3, 2015

(51) Int. Cl.
*G06F 17/50* (2006.01)

(52) U.S. Cl.
CPC ......... *G06F 17/505* (2013.01); *G06F 17/5022* (2013.01)

(58) Field of Classification Search
CPC .......................... G06F 17/505; G06F 17/5045
USPC ......................................... 716/100–104, 132
See application file for complete search history.

(56) References Cited

U.S. PATENT DOCUMENTS

| | | | |
|---|---|---|---|
| 6,438,739 B1 * | 8/2002 | Yamada | G06F 17/5045 716/104 |
| 6,629,298 B1 | 9/2003 | Camporese et al. | |
| 7,143,367 B2 | 11/2006 | Eng | |
| 7,246,340 B1 * | 7/2007 | Van Antwerpen | G06F 17/505 716/104 |
| 7,386,523 B2 | 6/2008 | Diao | |
| 7,600,211 B1 * | 10/2009 | Goldberg | G06F 17/5045 716/104 |
| 7,761,820 B2 | 7/2010 | Berger et al. | |

(Continued)

FOREIGN PATENT DOCUMENTS

| | | |
|---|---|---|
| EP | 0271596 A1 | 6/1988 |
| WO | WO2009100542 A1 | 8/2009 |
| WO | WO2009111885 A1 | 9/2009 |

OTHER PUBLICATIONS

J. Keinert et al., "Systemcodesigner—An Automatic ESL Synthesis Approach by Design Space Exploration and Behavioral Synthesis for Streaming Applications," ACM Transactions on Design Automation of Electronic Systems, vol. 14, No. 1, Article 1, Pub. date: Jan. 2009.

(Continued)

*Primary Examiner* — Paul Dinh
(74) *Attorney, Agent, or Firm* — Mercedes L. Hobson; Michael J. Chang, LLC (57) ABSTRACT

In one aspect, a method for tuning input parameters to a synthesis program is provided which includes the steps of: (a) selecting a subset of parameter settings for the synthesis program based on a tuning optimization cost function; (b) individually running synthesis jobs in parallel for each of the parameter settings in the subset; (c) analyzing results from a current iteration and prior iterations, if any, using the cost function; (d) using the results from the current iteration and the prior iterations, if any, to create combinations of the parameter settings; (e) running synthesis jobs in parallel for the combinations of the parameter settings in a next iteration; and (f) repeating the steps (c)-(e) for one or more additional iterations or until an exit criteria has been met.

16 Claims, 7 Drawing Sheets

(56) References Cited

U.S. PATENT DOCUMENTS

| | | | |
|---|---|---|---|
| 8,010,922 B2 | 8/2011 | Malgioglio et al. |
| 8,028,266 B2 | 9/2011 | Ramsour et al. |
| 8,122,399 B2 | 2/2012 | Bowers et al. |
| 8,397,204 B2 | 3/2013 | Sengupta et al. |
| 2004/0083083 A1 | 4/2004 | Doganaksoy et al. |
| 2006/0030965 A1 | 2/2006 | Williams et al. |
| 2010/0306681 A1 | 12/2010 | Loberg et al. |
| 2013/0091482 A1 | 4/2013 | Carrion |
| 2013/0218529 A1 | 8/2013 | Vikstrom et al. |

OTHER PUBLICATIONS

M. Gries, "Methods for Evaluating and Covering the Design Space during Early Design Development," Technical Memorandum UCB/ERL M03/32, Aug. 12, 2003.

T.J. Kowalski et al., "The VLSI Design Automation Assistant: Prototype System," IEEE 20th Design Automation Conference, Jun. 1983.

T.J. Kowalski et al., "The VLSI Design Automation Assistant: From Algorithms to Silicon," IEEE Design & Test (Aug. 1985).

T.J. Kowalski et al., "The VLSI Design Automation Assistant: What's in a Knowledge Base," IEEE 22nd Design Automation Conference (Jun. 1985).

L. Trevillyan et al., "An Integrated Environment for Technology Closure of Deep-Submicron IC Designs," IEEE Design & Test of Computers, vol. 21:1, pp. 14-22, Jan.-Feb. 2004.

M.M. Ziegler et al., "Power Reduction by Aggressive Synthesis Design Space Exploration," IEEE International Symposium on Low Power Electronics and Design Sep. 2013, (ISLPED13).

S.E. Ahnert et al., "Clustering signatures classify directed networks," Phys. Rev. E 78, 036112 (Sep. 2008).

A. Arcuri et al. "Parameter Tuning or Default Values? An Empirical Investigation in Search-Based Software Engineering," Empirical Software Engineering, Jun. 2013, vol. 18, Issue 3, pp. 594-623.

T.M. Mitchell et al., "LEAP: A Learning Apprentice for VLSI Design," Machine Learning: An Artificial Intelligence Approach, vol. III, pp. 573-580 Morgan Kaufmann Press 1990.

* cited by examiner

| Diagnosis | Prescription |
|---|---|
| If wire delay > X | Direct change: up wire code |
| Lat -> PO / PI -> Lat & neg timing, but pos timing on next / prior cycle, | Resynthesize: generate attraction file for Lat to PO / PI rerun synthesis |
| If gate delay > X & gate is an xor3, generation | Resynthesize: add parm to exclude xor3 and rerun synthesis |
| If assertion is impossible, generate alert | Alert only |

SYNTHESIS TUNING SYSTEM FOR VLSI DESIGN OPTIMIZATION

FIELD OF THE INVENTION

The present invention relates to circuit synthesis techniques, and more particularly, to techniques for automating the process of tuning synthesis parameters.

BACKGROUND OF THE INVENTION

The design of modern digital very-large-scale integration (VLSI) circuits increasingly relies on the circuit synthesis techniques. Even high-performance critical components that were conventionally implemented using custom design techniques (i.e., those based on schematic entry followed by placement and routing as opposed to synthesis which automates the design process beginning at the RTL level) are now being synthesized using advanced synthesis tools. Improving design productivity and enhancing design flexibility are just a few of the benefits of synthesis-centric design methodologies. However, the shift from custom design to synthesis requires that synthesis tools tackle more difficult designs. Furthermore, as technology scaling provides diminishing performance improvements in advanced nodes, there is a greater need to optimize the synthesis results to realize the performance goals of a chip.

Advanced synthesis tools provide a large number of knobs, settings, and parameters that can greatly impact the quality of results for a specific design. The number of tunable parameters in a synthesis tool can be on the order of hundreds or even thousands of options in some cases, e.g., the PDSrtl synthesis program from International Business Machines Corporation. See, for example, L. Trevillyan et al., "An Integrated Environment for Technology Closure of Deep-Submicron IC Designs," IEEE Design & Test of Computers, vol. 21:1, pp. 14-22, January-February 2004. Quite often fine tuning many of these options is needed to achieve the quality of results needed for modern VLSI circuits. In fact, the modification of parameters can have such a large impact on the quality of results, that tuning synthesis parameters is one of the most effective approaches to design optimization. See, for example, M. M. Ziegler et al., "Power Reduction by Aggressive Synthesis Design Space Exploration," IEEE International Symposium on Low Power Electronics and Design September 2013, (IS-LPED13). In many cases, parameter tuning can lead to a wide range of quality of results, with a marked increase in quality achievable (over default synthesis results) by modifying synthesis parameters in terms of timing and power.

However, while varying parameter settings can have a large impact on the quality of results, the process of finding the correct parameter settings can often be tedious and non-intuitive for even experienced human designers. Novice designers often find manually trying to find correct parameter settings an even more daunting task.

Thus, techniques for automating the process of tuning synthesis parameters would be desirable.

SUMMARY OF THE INVENTION

The present invention provides techniques for automating the process of tuning input parameters to a (e.g., circuit) synthesis process. In one aspect of the invention, a method for tuning input parameters to a synthesis program is provided. The method includes the steps of: (a) selecting a subset of parameter settings for the synthesis program based on a tuning optimization cost function; (b) individually running synthesis jobs in parallel for each of the parameter settings in the subset; (c) analyzing results from a current and prior iterations, if any, using the tuning optimization cost function; (d) using the results from the current and the prior iterations, if any, to create combinations of the parameter settings; (e) running synthesis jobs in parallel for the combinations of the parameter settings in a next iteration; and (f) repeating the steps (c)-(e) for one or more additional iterations or until an exit criteria has been met.

A more complete understanding of the present invention, as well as further features and advantages of the present invention, will be obtained by reference to the following detailed description and drawings.

DETAILED DESCRIPTION OF PREFERRED EMBODIMENTS

1. Introduction: Provided herein is an automated system for tuning synthesis parameters to optimize a circuit design for one of more design objectives and/or constraints. The present system is referred to herein as a "Synthesis Tuning System," or SynTunSys. SynTunSys can be used in conjunction with an existing circuit synthesis tool and controls the process of tuning synthesis parameters. As will be described in detail below, the present system explores the parameter design space by submitting multiple scenario settings in parallel, evaluating the results of each scenario using a cost function, and then submitting new and more complex scenarios based on the results of the previous scenarios. The process iterates to hone in on settings that improve the results until a convergence criteria is met. The task essentially boils down to a parameter search to finding the best settings for numerous parameters to best optimize the design goals. While the present techniques are described below in the context of tuning circuit synthesis parameters, the present techniques are more broadly applicable to any parameter optimization problem.

Figure 1:
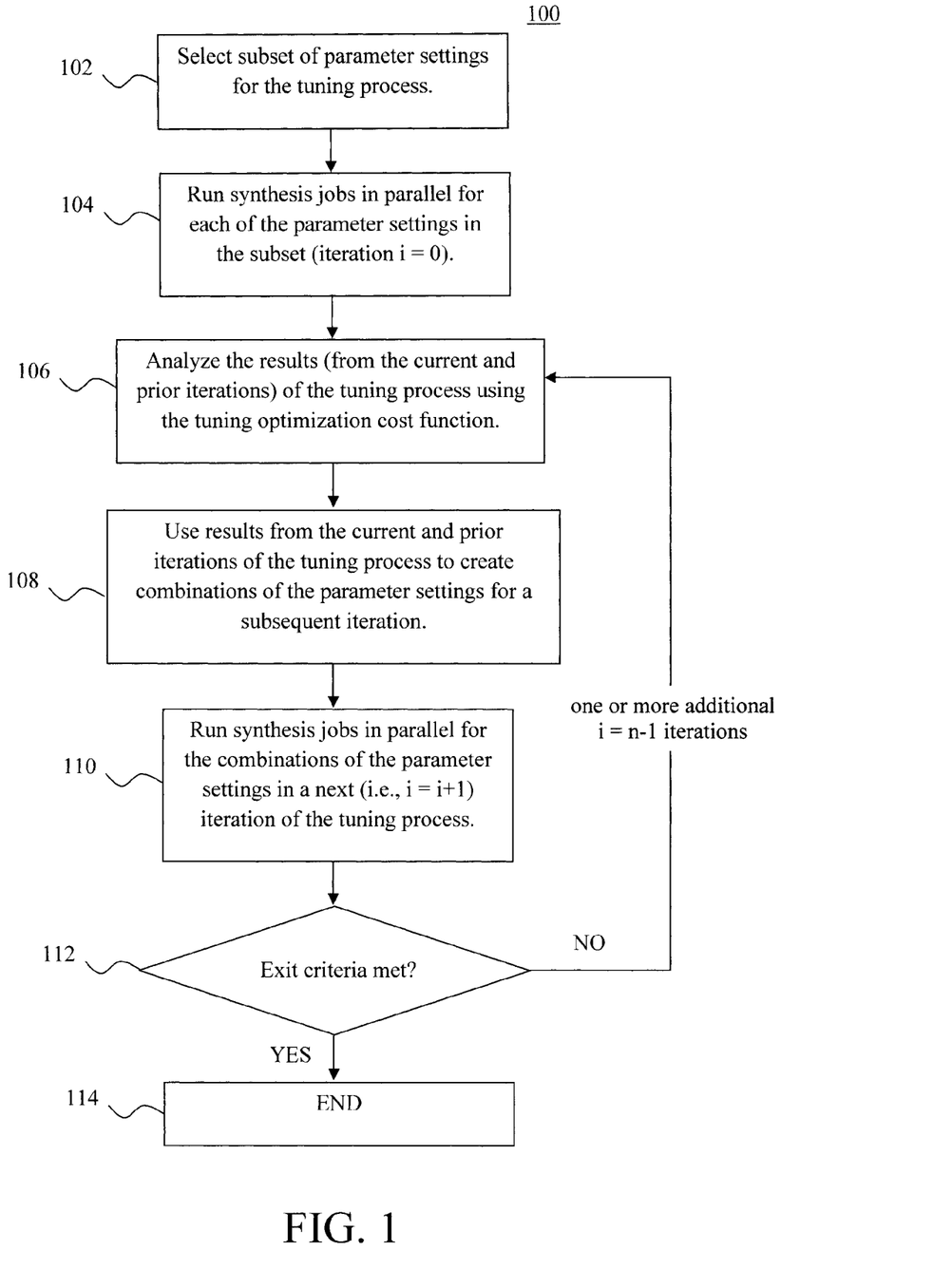
FIG. 1 is a diagram illustrating an exemplary methodology for tuning input parameters to a synthesis program according to an embodiment of the present invention.

A general description of the present techniques for tuning input parameters to a synthesis program is provided by way of reference to methodology 100 of FIG. 1 followed, by way of references to FIGS. 2-12, by the description of an exemplary implementation of the present techniques in the context of optimizing parameters in a circuit synthesis process. Referring first to FIG. 1, in step 102, an initial subset of possible parameter settings for the synthesis is selected based on a tuning optimization cost function. As will be described in detail below, the possible parameter settings (or "primitives") may be provided as input data to the present process via a primitives library, along with the tuning optimization cost function and other data via a Rules file as well as synthesis input data for circuit level synthesis via a synthesis data database. The primitives selected for a specific tuning run in step 102 may be a subset of primitives in the primitives library, which may reduce the tuning search space up front. The initial subset of primitives for a specific tuning run will be primitives that are expected to perform well with respect to the cost function of the specific tuning run. By way of example only, the criteria for selecting the initial primitive subset may be based on an automated analysis of historical performance of primitives across past tuning runs with respect to the cost function, as described in section 2, below. Likewise, the tuning program user may select or modify the initial primitive subset based on experience and/or intuition. As will be described in detail below, according to one exemplary implementation of the present techniques, the synthesis program may include a circuit synthesis program wherein the parameter settings are circuit synthesis parameter settings.

In step 104, synthesis jobs are run in parallel for each of the parameter settings in the subset (selected in step 102). By running each primitive/parameter setting individually, the sensitivity of the process to each parameter setting can be ascertained in this first (i.e., i=0) iteration of (tuning) methodology 100. Namely, as described below, in subsequent iterations of the method, multiple primitives will be combined and analyzed, e.g., in an attempt to improve the results over any given one primitive.

Once all of the synthesis jobs in the first iteration have completed, or alternatively a large enough fraction of the synthesis jobs in the first iteration have completed (i.e., a user-specified percent of synthesis jobs, e.g., 90%) and/or a (predetermined) time limit, in step 106 the results from the current and prior iterations (if any) of the synthesis program are analyzed using the tuning optimization cost function. In a first run of methodology 100, the first i=0 iteration is the current iteration, and there are no prior iterations. However, in subsequent (i=n−1) iterations of methodology 100—see below, the analysis in step 106 is performed for the current iteration performed and all prior iterations of methodology 100. The percent completion requirement and the run time limit options are in place to avoid excessively long run time of an iteration, which may be held up by a small number of synthesis jobs. According to an exemplary embodiment, the tuning optimization cost function is used to represent multiple design metrics with a single cost number, i.e., as described below the tuning optimization cost function is configured to convert multiple design metrics (e.g., timing, power, and congestion metrics) into a single cost number that can be used to rank the results. By way of example only, as described in detail below, the particular metrics can be selected by a user(s). The user(s) may also specify the importance of each of the selected metrics to the design by applying weights to the metrics. The tuning optimization cost function may then be expressed as a weighted sum of the design metrics.

In step 108, the results from the first (i=0) iteration of the synthesis program are then used to create combinations of the parameter settings for subsequent iterations. For instance, according to an exemplary embodiment, the tuning optimization cost function is used to rank the results from the first iteration, e.g., from a lowest cost (best result), to a highest cost (worst) result.

Further, based on such a cost ranking of the results, the primitives/parameter settings corresponding to the top (predetermined) N cost ranked results are placed in a survivor set. Additionally, in order to leverage the knowledge of experienced designers, the process may permit users/designers to influence which primitives/parameter settings are placed in the survivor set. For instance, a designer might know of a scenario (e.g., a combination of primitives/parameter settings) that performs well, but has not yet been put in the survivor set. The user/designer may be given the option to actively place that data in the survivor set.

A dense search of the survivor set design space is then performed in subsequent iterations. For instance, the primitive/parameter setting combinations may be created in step 108 by combining each (single) primitive/parameter setting in the survivor set with (exactly one) other primitive/parameter setting from the survivor space. The goal is to test all combinations of two primitives. See, for example, the exemplary embodiment illustrated in FIG. 4 (described below), wherein for the S1 stream of scenarios, the i=1 iteration tests all combinations of 2 primitives, the i=2 iteration tests all combination of 3, etc. It is notable that this configuration is specific to the S1 stream in the exemplary embodiment of FIG. 4. For instance, the S1 stream in the exemplary embodiment of FIG. 8 works differently—see below.

As will be described in detail below, the primitive/parameter setting combinations may also be created in step 108 using formula-based guesses, e.g., by i) combining all of the parameter settings in the survivor set, ii) combining the N lowest cost parameter settings, or iii) combining all parameter settings that lower cost below a certain predetermined amount (e.g., lower than a reference parameter setting(s). Yet further, the primitive/parameter setting combinations may further be created in step 108 using historical data to guide selection of the parameter settings for a particular design. By way of example only, according to an exemplary embodiment, an archive of historical data (i.e., data relating to each of the tuning runs which have been performed in the past) is maintained. The results of the first iteration can be used to search the archive. For instance, as described in detail below, a clustering process may be implemented with the results obtained from the first iteration of the process as a clustering signature to cluster the data in the archive and thereby find (historical) data in the archive similar to the design space of the primitives.

Based on the combinations of primitives created in step 108, in step 110 synthesis jobs are run in parallel for the combinations of the parameter settings in a next (i.e., i=i+1) iteration of the synthesis program. Methodology 100 is performed iteratively to hone in on parameter settings that improve the results until an exit criteria has been met. Thus, in step 112 a determination is made as to whether (or not) the exit criteria has been met. The exit criteria might simply be that a predetermined number of iterations have been performed. Namely, the user might set a maximum limit on the number of iterations to be run. Further, as provided above the goal is to iteratively hone in on settings that improve the results. Thus, in addition (or alternatively) to a predetermined number of runs, one might consider the process complete when a run fails to improve results from one or more previous iterations.

If the exit criteria is met, then in step 114 the process is ended. On the other hand, if the exit criteria is not met then, as shown in FIG. 1, steps 106-112 are repeated for one or more additional i=n-1 iterations (until an exit criteria has been met).

Figure 2:
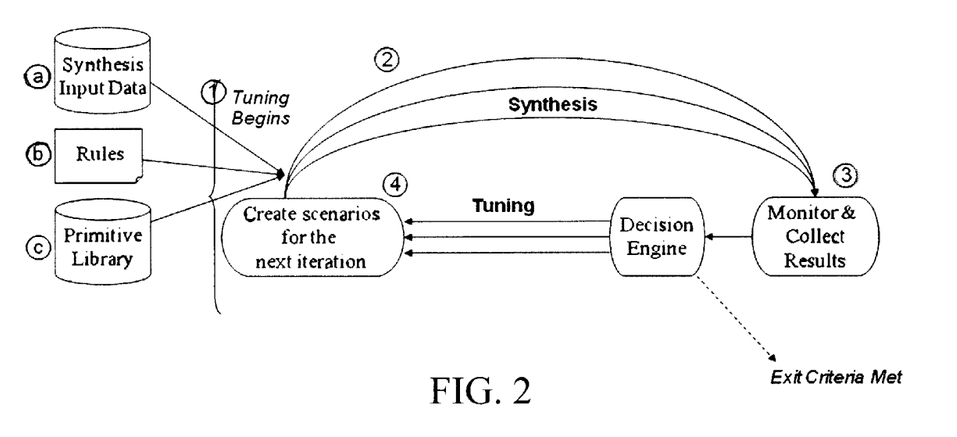
FIG. 2 is a diagram providing an overview of the present automated system for tuning input parameters to a synthesis program according to an embodiment of the present invention.

2. System Overview: An exemplary implementation of the present techniques in the context of parameter optimization (i.e., SynTunSys) in conjunction with a circuit synthesis program is now provided. FIG. 2 is a diagram providing an overview of the present system. As shown in FIG. 2, the tuning process begins at step 1. The flow takes the following macro (i.e., a circuit partition) synthesis input data as well as SynTunSys input data: a) standard synthesis input data for circuit level synthesis (labeled "Synthesis Input Data") which includes for example a register transfer level (RTL) description, a physical abstract providing macro boundaries and pin locations, and timing assertions; b) a SynTunSys "Rules" file (labeled "Rules") which describes the "primitives" or parameter settings to be explored, a tuning optimization cost function to be optimized, and potentially other additional options—as described below; and c) a library of primitives (labeled "Primitive Library") that contains the detailed definitions of all possible options, i.e., parameter settings, that could be explored. The Rules file selects a subset of the possible options based on the tuning optimization cost function to be optimized.

The process begins by taking as input a) the synthesis input data, b) the SynTunSys Rules file and c) the primitives, and runs multiple synthesis scenarios in parallel (see step 2) based on the primitives in the Rules file. After the jobs are submitted, the system starts a monitoring process (see step 3) to monitor the progress of the parallel jobs. When either all jobs are complete, or a large enough fraction of jobs are complete (i.e., a user-specified percent of synthesis jobs, e.g., 90%), or a time limit is reached, the monitoring process initiates a results collection process which collects and analyses the results of the parallel synthesis jobs. Based on the collected results, a decision engine via a tuning process is used to create a new set of the scenarios (synthesis parameter settings) to be run in the next iteration. These new jobs begin with the initial input data and are also run in parallel, i.e., the next iteration does not modify the output of the prior iteration, but re-synthesizes the macro from the beginning. The process iterates attempting to improve upon results until an exit criteria is met. This flow will be described in further detail below.

Figure 3:
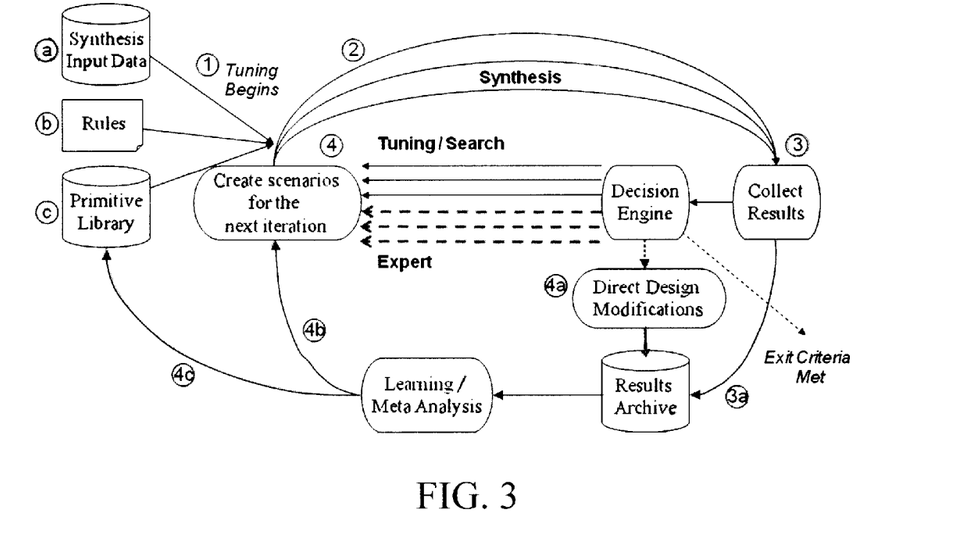
FIG. 3 is a diagram illustrating an expanded version of the present system which further includes an expert analysis system and a results archive according to an embodiment of the present invention.

According to one exemplary embodiment, an expanded version of the present system is shown illustrated in FIG. 3.

The system shown in FIG. 3 expands on the base system of FIG. 2. Like the base system, the expanded system of FIG. 3 takes as input a) the synthesis input data, b) the SynTunSys Rules file and c) the primitives (step 1), runs multiple synthesis scenarios in parallel based on the primitives in the Rules file (step 2), and monitors the progress of the parallel jobs (step 3). The expanded version of SynTunSys shown in FIG. 3, however, adds two additional components: 1) an expert analysis system which runs in tandem with the SynTunSys tuning/search process; and 2) a results archive that captures the results, e.g., from all SynTunSys synthesis scenarios, from all macros, and from all users. A detailed description of the SynTunSys tuning/search process vis-à-vis the expert analysis system will be provided below, however in general one important difference is that the SynTunSys tuning/search process employs a "black box" tuning view of the problem, whereas the expert analysis system uses heuristics based on expert rules of thumb. Thus, in addition to generating new scenarios for the next iteration (see step 4 in FIG. 3), the expert analysis system can also directly modify the design after the synthesis job has completed as shown in step 4a of FIG. 3. A detailed description of the expert component of the system is provided in section 5, below.

An archiving capability is the second component added to the base SynTunSys system in FIG. 3. The result archive is a database-like storage system that archives the input parameters and results for the scenarios run via SynTunSys. See step 3a of FIG. 3. The archive holds historical data across different projects, macros, and users. Once a sufficient amount of data is archived (i.e., a sufficient amount of data such that statistical trends can be observed), the archive can be data mined and analytics (labeled "Learning/Meta Analysis") can be applied for a variety of goals. One exemplary application is to predict which scenarios should be tried on a macro based on historical results (see step 4b). An exemplary process for predicting scenarios is provided in section 4.2 below. Another exemplary use is to determine which initial primitives are effective for certain design goals, e.g., timing, power, congestion improvement, etc. (see step 4c).

Figure 4:
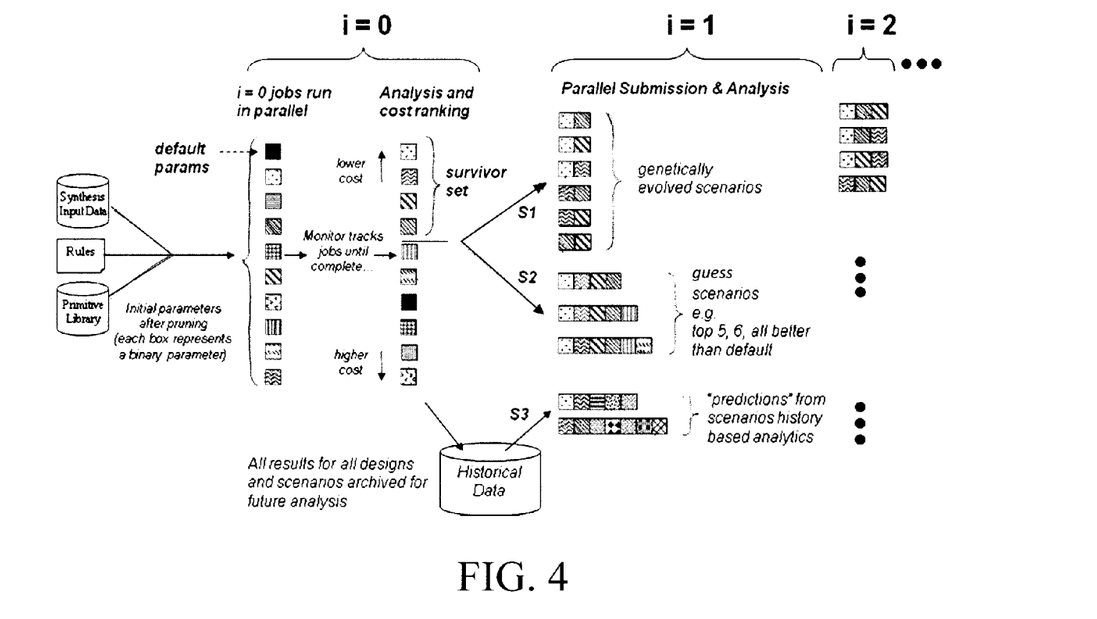
FIG. 4 is a diagram illustrating the underlying process that controls the scenarios explored during each iteration according to an embodiment of the present invention.

3. Base SynTunSys Control Process Details: The underlying process that controls the scenarios explored during each iteration (also referred to herein as "the control algorithm") is described in FIG. 4. As shown in FIG. 4, the process can employ a pseudo-genetic algorithm. This is however only one potential control algorithm that the SynTunSys could employ. Examples of other suitable control algorithms are provided below. In FIG. 4, each solid or textured square represents a primitive. Each primitive consists of one or more synthesis parameters set to a specific value. Each primitive performs an atomic action and was constructed by an expert user sometime in the past and added to an official library. Examples of primitive actions are: set logic decomposition directives, set native VT (i.e., transistor threshold voltage), and swap VT levels, or set latch configurations, etc. The underlying synthesis parameters may be set to integer or string values (non-Boolean), making potential space of the settings large. On the other hand, primitives contain synthesis parameters with specific settings. This makes primitives Boolean in nature, i.e., a primitive is either used or not. In addition, the total number of primitives available is far less than the natively available synthesis parameters. Therefore using primitives reduces the design space search from 1000's of multi-valued parameter settings to 100's of Boolean primitives.

From the 100's of available primitives, a subset are chosen for exploration based on the goals of the tuning optimization cost function, which may be a combination of timing, power, and congestion metrics. As provided above, the initial subset of primitives for a specific tuning run will be primitives that are expected to perform well with respect to the cost function of the specific tuning run based, for example, on an automated analysis of historical performance of primitives across past tuning runs with respect to the cost function and/or experience/intuition of the tuning program user. The selected primitives, cost function, and additional tuning options are set in the Rules file (described in further detail below). The SynTunSys process begins by reading the Rules file and launching a first iteration (i=0) which runs parallel synthesis jobs for each primitive in the rules file. As described above, each synthesis job in i=0 has only the single primitive enabled, thus i=0 tests the sensitivity of each primitive. The SynTunSys monitor process tracks each synthesis job. When either all jobs complete, or a large enough fraction of jobs complete (i.e., a user-specified percent of synthesis jobs, e.g., 90%), or a time limit is reached, the monitor process initiates a results collection process which collects the results of the parallel synthesis jobs. The results of each synthesis job are analyzed by the tuning optimization cost function (described in section 3.2 below) and ranked from lowest cost (best) to highest cost (worst). From this cost ranked list a "survivor set" is chosen. As described above (and in further detail below) the survivor set may contain the N lowest cost ranked results and/or designer-influenced entries. The size of the survivor set is set by the user in the Rules file. The size of the survivor set influences the number of synthesis jobs in the tuning run. For example, in some cases the user may want to reduce the number of synthesis jobs in a tuning run to reduce the compute resource requirements. In other cases, the user may want to perform a more thorough tuning run that users more compute resources, which would be driven by a larger survivor set.

After selecting the survivor set, the process proceeds to the second iteration (i=1). During the i=1 iteration, a new set of more complex synthesis scenarios are submitted in parallel based on the sensitivity results from i=0. In the example shown in FIG. 4 there are 3 streams of new scenarios which are depicted as streams S1-S3. The main stream of scenarios is S1, where each primitive in the survivor set is combined with one other primitive in the survivor set to form a new synthesis scenario. The S1 stream performs a dense search of survivor set design space, combining one additional primitive in each iteration. Stream S2 scenarios are "guess scenarios." These S2 scenarios are formula-based guesses, e.g., 1) combine all primitives in the survivor set, or 2) combine the N lowest cost primitives, or 3) combine all primitives that have a lower cost than the default parameters (a.k.a. "params") (or another reference primitive), etc. Stream S2 scenarios include more complex scenarios than stream S1 scenarios (e.g., more primitives are combined in S2), which searches the design space outside standard S1 dense search, i.e., outside of the survivor set (see FIG. 4). The S3 stream of scenarios use the sensitivity test results to search the archive for predictions of which scenario may work well on the macro (see step 4b in FIG. 3). There are various prediction techniques possible for the S3 stream—one of which is described in section 4.2 below.

Additional iterations proceed in the same manner to i=1 in that the S1 stream combines i+1 primitives to form more complex scenarios. Namely, according to the exemplary control process illustrated in FIG. 4, the S1 stream does an exhaustive search of the survivor set primitives combinations, adding one primitive per iteration (i.e., i=1 combinations have two primitives, i=2 combinations have three primitives, etc.)—that is except if an early exit criteria is met or if some scenarios are estimated to not be beneficial, they are skipped. Further S2 and S3 stream can also be explored. The process completes based on a number of iterations requested in the Rules file. Alternative exit criteria can also halt the process as well, e.g., if the last iteration failed to improve upon results. The final results collection looks back across all synthesis scenarios explored and cost ranks the scenarios. It is notable that the process described in conjunction with FIG. 4 is only one of a number of potential control processes that may be implemented in accordance with the present techniques. For instance, an alternative control algorithm is provided in section 4.3 below.

Figure 5:
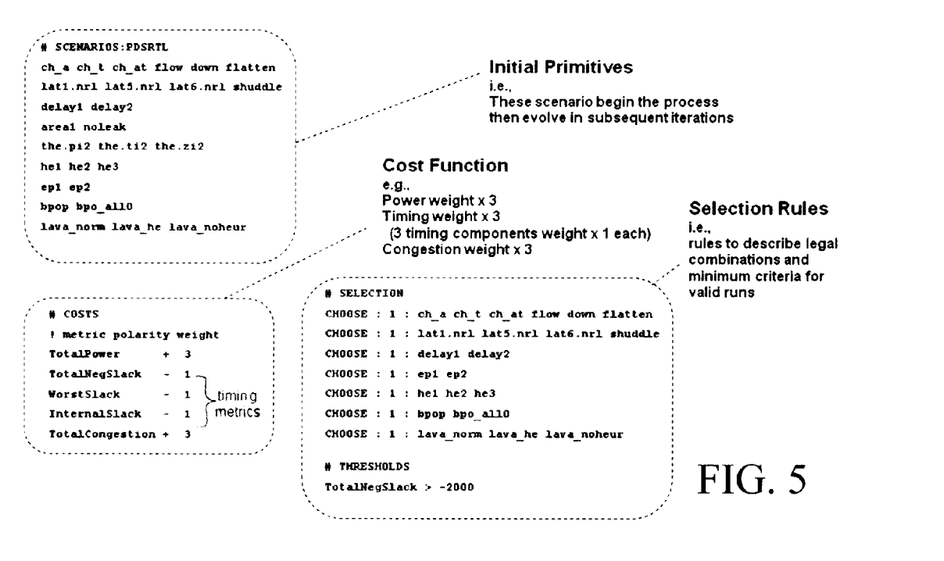
FIG. 5 is a diagram illustrating key sections of an exemplary Rules file according to an embodiment of the present invention.

3.1 Rules File Structure: FIG. 5 shows an example of key sections of the Rules file. As shown in FIG. 5, the primitives to be explored are listed in the file. By convention, the primitives have short names that represent their function. The cost function syntax describes the optimization goals of the tuning run and will be described in more detail in section 3.2 below. The selection section contains additional rules to guide the process of choosing the survivor set. More details on the selection process are given in section 3.3 below.

3.2 Cost Function: The cost function is used to convey the optimization goals for the tuning run. The cost function converts multiple design metrics into a single cost number, which allows cost ranking of scenarios. According to an exemplary embodiment, a user first selects one or more design metrics (e.g., timing, power, and congestion, metrics) that can be collected from a synthesis run results and applies weights to specify the importance of each of the metrics. The Rules file in FIG. 5 shows 5 exemplary design metrics that may be included in a cost function. This cost function is equally weighted for power, timing (3 timing metrics, each with a weight of 1), and congestion. The cost function for the cost calculation may be expressed as a "normalized weighted sum" of the design metrics as follows:

$$\text{Cost} = \sum_{i=1}^{m} W_i \cdot Norm(M_i) \tag{1}$$

wherein $W_i$=weight$_i$ and $M_i$=metric$_i$. It is notable that the cost calculation shown in Equation 1 is only one possible implementation. Using the exemplary design metrics shown in FIG. 5, wherein Total Power and Total Congestion are each given a weight of 3 and the 3 timing design metrics are given a weight of 1, cost may be computed as follows:

Cost=3×N(Power)+1×N(Worst Slack)+1×N(Internal Slack)+1×N(Total Negative Slack)+3×N(Congestion) (2)

Figure 6:
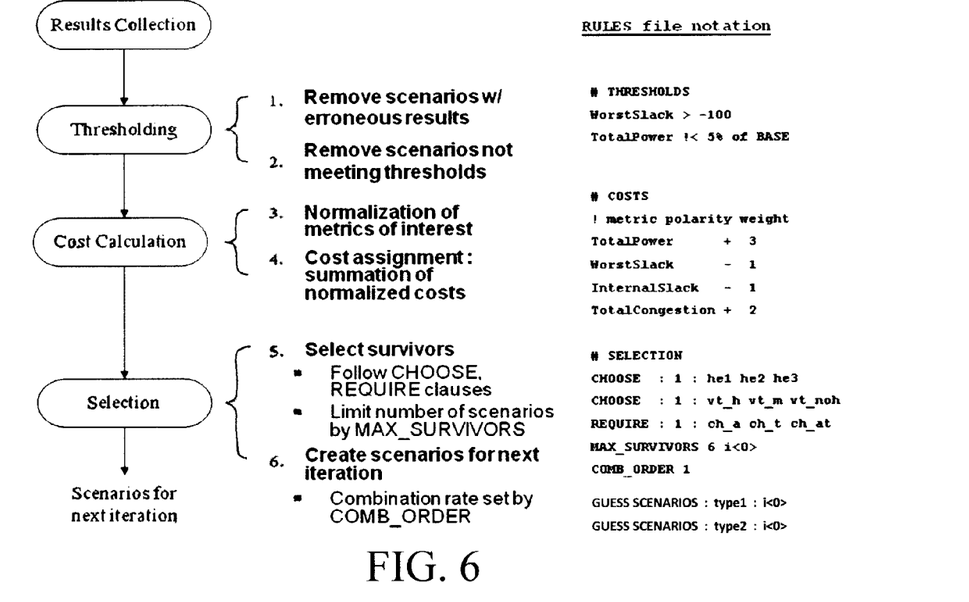
FIG. 6 is a diagram illustrating details of a decision engine of the present system according to an embodiment of the present invention.

3.3 Decision Engine Details: FIG. 6 provides additional details of the SynTunSys decision engine. As shown in FIG. 6, upon collecting results for each synthesis scenario, the decision engine first uses a thresholding process to remove problematic scenarios early so they are not included in the cost analysis. Specifically, the thresholding process looks across all scenarios and removes those scenarios having erroneous results, which suggest problems in the synthesis run, i.e., erroneous synthesis runs (see thresholding substep 1). It is notable that erroneous synthesis runs can be flagged by either the synthesis job's return code and/or invalid values for design metrics. Next the thresholding substep looks to the Rules for any user specified minimum requirements (see thresholding substep 2) and removes scenarios not meeting thresholds. This allows the user to exclude scenarios that fall outside the bounds of an acceptable result/solution. Following the cost calculation, as described above, the scenarios are ranked by cost. Namely, as described above, the cost function is used to convert multiple design metrics into a single cost number, and may be expressed as a "normalized weighted sum" of the design metrics (see cost calculation substeps 3 and 4).

The selection step is then used to select the survivor set which will move on and combine in later iterations, as well as, the scenarios for the next iteration. Survivor set selection is generally only run after the i=0 iteration. Beyond simply taking the top N cost ranked scenarios as the survivor set, the selection step looks to Rules file options to allow the user to influence the selection. For example, the CHOOSE clause (see selection substep 5) allows the user to create a condition such that only M of the listed primitive set can be selected as a survivor. The intention of the CHOOSE clause is to ensure primitives that exercise similar synthesis options are not overrepresented in the survivor set. Correctly setting the CHOOSE clause encourages diversity in the survivor set, which can lead to a wider design space for exploration. The REQUIRE clauses (see selection substep 5) forces the best M primitives from the listed primitive set to be included in the survivor set. This allows the user to force certain primitives to be selected, despite cost ranking. Wisely setting the REQUIRE clauses can also improve diversity, but care must be taken as poor REQUIRE clause settings can hinder the selection process.

The MAX_SURVIVORS setting in the selection section of the Rules file (see selection substep 5) determines the size of the survivor set. Generally, this will also set the number of iterations to be MAX_SURVIVORS−1, unless other exit criteria are set.

In terms of the S1 stream next iteration primitives, the COMB_ORDER setting (see selection substep 6) determines how many primitives are combined in the next iteration. Generally 1 is used (see, for example, FIG. 4), but the number of iterations can be shorted by combining say 2 primitives per iteration. The S2 stream guess scenarios are also specified in the selection section of the Rules file. For example, FIG. 6 specifies 2 guess scenarios after iteration 0. The S3 stream scenarios are described in section 4.2 below.

4. Advanced SynTunSys Optimization: This section describes more advanced SynTunSys optimization techniques.

4.1 Base Scenarios and Multi-Pass SynTunSys Runs: Users may have existing sets of synthesis parameters that perform well and SynTunSys is used to try and improve upon the scenario. In that case, the existing (well-performing) solution can be set as a BASE setting in the Rules file, in addition to the standard Rules files options described above. With this setting, SynTunSys adds the primitives being explored to the BASE synthesis parameters. The BASE setting provides a mechanism to include a set of synthesis parameters in all scenarios, i.e., for each scenario, the BASE parameters are first included, and then unique parameters for the scenario are included. In other words, each scenario builds on a fixed base, declared using the BASE setting.

Likewise the best scenarios of a previous SynTunSys run can be fed as BASE synthesis parameters for a new SynTunSys run. Due to resource limitations, a single SynTunSys run may not exhaustively explore the complete design space. Thus further design space exploration can be attained by running multiple SynTunSys runs in sequence. These multi-pass SynTunSys runs hinge on updating the Rules file for the next SynTunSys using the following exemplary principles: 1) add a prior best scenario as a BASE (wherein the prior best scenario can be taken from any past tuning run or tuning run iteration, not just the immediately preceding run); 2) prune (i.e., remove) both primitives contained in the BASE and primitives that perform poorly in the prior run; and 3) add new (previously unexplored) primitives to explore new design space options. Poorly performing primitives have high scores based on the cost function analysis or higher scores relative to the baseline scenario. Rules of thumb for pruning of highest cost primitives can be created, e.g., prune the 50% of the primitives having the highest cost. The process of running multi-pass SynTunSys can also be done in an automated fashion.

Figure 7:
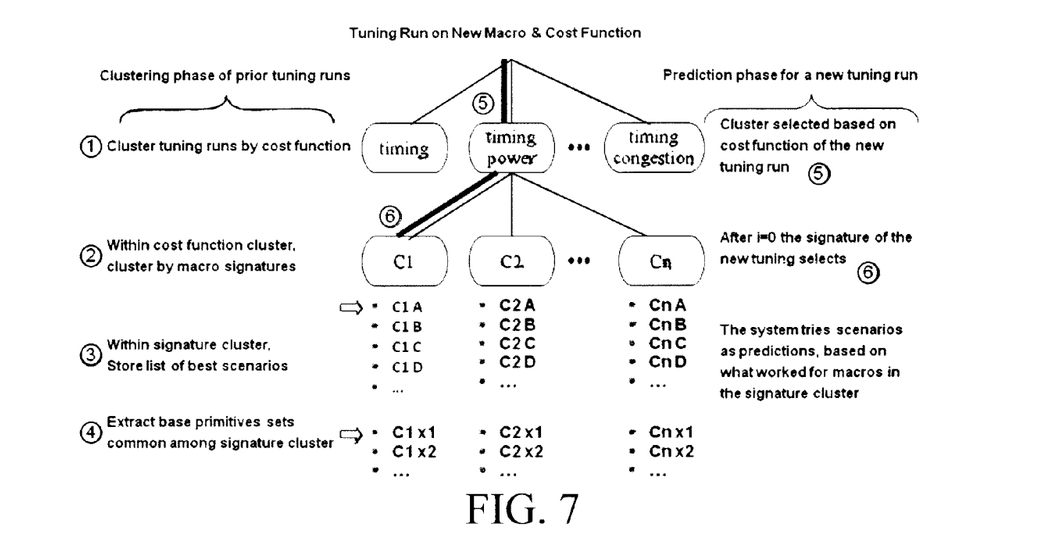
FIG. 7 is a diagram illustrating an exemplary process for using historical data to predict effective synthesis scenarios according to an embodiment of the present invention.

4.2 Predictive Scenarios Based on Historical Data: Using historical data stored in the results archive, the present system can be used to predict which scenarios will be effective for specific macros. Data from each overall SynTunSys tuning run as well as each individual synthesis run within a tuning run is logged in the results archive. Specifically, the Rules files, cost ranking results, synthesis parameters, log files, and synthesis result metrics are stored for each synthesis run. Now described by way of reference to FIG. 7 is an exemplary process for using this historical data to predict effective scenarios. It is notable that what is described here is merely an example and any other suitable prediction process may also be used in accordance with the present techniques.

As shown in FIG. 7, the prediction process begins with a clustering phase by grouping tuning runs stored in the archive based on the cost function used for the tuning run (see step 1). In general, any multi-dimensional clustering technique can be employed including, but not limited to, a k-means clustering process. As is known in the art, clustering is a mathematical measure of similarity between objects. Clustering is used to obtain a collection/cluster of objects which are similar to one another and dissimilar to objects in other clusters. K-means clustering is an unsupervised learning clustering process that can be used to generate fixed-size clusters based, for example, on distance metrics for similarity. See, for example, U.S. Pat. No. 7,386,523 issued to Diao entitled "K-Means Clustering Using T-Test Computation." The resulting clusters/groups from the cost function clustering are also referred to herein as "cost function groups" or "cost function clusters." The clustering can be fuzzy in that cost function metrics do not have to exactly match within a group, but the groups should represent a specific set of goals. For example, cost functions that place relatively the same weights on timing, power, and congestion can be grouped, even if the precise metrics and metric weights in the cost functions differ. This fuzzy clustering of cost functions ensures each cost function cluster has a sufficient number of members. In more detail, to facilitate increasing the number of members within a cost function group, a coarser set of metrics can be created for each cost function. For example, in equation (2) above there are multiple cost function metrics for measuring different aspects of timing, namely: overall worst slack path, internal worst slack, and total negative slack. During the cost function grouping process it may be advantageous to generalize the specific timing metrics such that each of the three timing metrics represents emphasis on single timing metric. This generalized cost function example is shown in equation (3), where the three specific timing components are grouped into a single timing term.

$$\text{Cost}=3\times N(\text{Power})+3\times N(\text{Timing})+3\times N(\text{Congestion}) \quad (3)$$

Next at step 2, the results of i=0, the sensitivity test, are used as a clustering signature to create sub-clusters within each of the cost function groups. The resulting sub-clusters from the cost function groups are also referred to herein as "signature sub-clusters." One example of a way to compute the signature of a tuning run is the relative cost ordering of primitives after the sensitivity test. The cost of each i=0 scenario within a tuning run can be normalized between 0 and 1 (with 0 being the best scenario, and 1 being the worst) to create a multi-dimensional vector. The use of clustering signatures is a technique generally known in the art, e.g., see S. E. Ahnert et al., "Clustering signatures classify directed networks," Phys. Rev. E 78, 036112 (September 2008) (which describes use of a multi-dimensional quantity as a clustering signature). Clustering can then be performed using standard clustering techniques which operate on multi-dimensional vectors (such as k-means clustering). Once the signature sub-clusters are formed, the best scenarios from each tuning run within a signature sub-cluster are ordered by cost—e.g., CnA, CnB, CnC, CnD (see step 3).

In addition, base primitive sets are extracted from the best scenarios (i.e., the best scenarios have the lowest cost when evaluated by the cost function) from the tuning runs in the signature clusters. The base primitive sets consist of primitives that commonly occur in the best scenarios (see step 4). For example, the number of primitive occurrences can be counted in the top 25% of scenarios (the 25% of scenarios having the lowest cost) in the signature sub-cluster. The primitives with the N highest counts are the commonly occurring primitives. The best scenarios and base primitives sets can be used as predictions for new macros that have similar signatures to existing clusters.

As shown in FIG. 7, the second phase (i.e., the prediction phase) of the process uses the cost function of a new tuning run to select a cost function cluster as shown by step 5. Next, after i=0 completes for the new tuning run, the i=0 signature is used to select a signature sub-cluster, as shown by step 6. The process has now located a prior set of tuning runs based on a similar cost function and with a similar i=0 signature as the new tuning run. The process then suggests base primitive sets (see above) from the signature sub-clusters and may also suggest some of the best cost ranks scenarios for the cluster. The base primitive sets for the cluster should embody the primitives that work for the cluster, but may be too general. On the other hand the best cost ranked scenario in the cluster may be too customized for a specific prior tuning run. Based on results of the predictive scenarios, the future iterations of the new tuning run may also access more base primitives sets and best scenarios from the archive.

4.3 Additional Control Algorithms: As provided above, there are multiple potential control processes for the SynTunSys control loop. One example was described in conjunction with the description of FIG. 4, above. Another possible control algorithm that can be used in conjunction with the present techniques is shown illustrated in FIG. 8.

Figure 8:
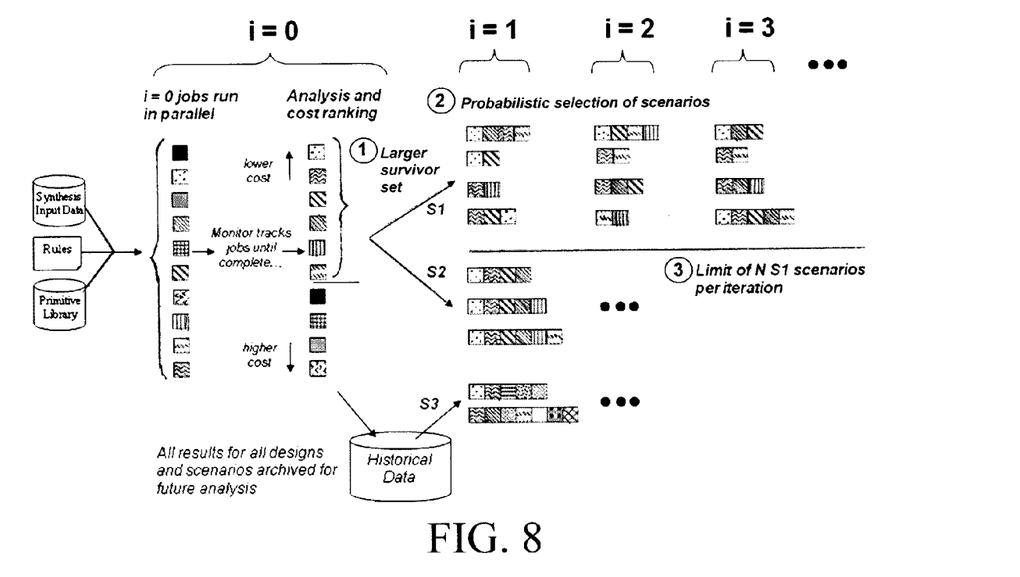
FIG. 8 is a diagram illustrating another exemplary control algorithm that can be used in accordance with the present techniques according to an embodiment of the present invention.

The SynTunSys control process illustrated in FIG. 8 is an alternate control algorithm for the system. It is similar to the SynTunSys control algorithm of FIG. 4, except with the following modifications as described below. The general concept of the process illustrated in FIG. 8 is to explore a larger design space (as compared to the base control algorithm of FIG. 4) using a sparse S1 search stream. In other words, while the control process of FIG. 4 performs a dense search of a smaller survivor set, the alternative process depicted in FIG. 8 searches a larger survivor set, but without having to try all possible combinations. In particular, there are three main differences from the base control algorithm which are enumerated in FIG. 8: 1) the survivor set is larger (the survivor set could be set in the Rules file as the top N scenarios, as in FIG. 6, or could be the top X percent of scenarios, e.g., the top 25% of scenarios would be in the survivor set)—wherein the survivor set size is set by the MAX_SURVIVORS set by the user in the Rules file, as shown in FIG. 6 and described above; 2) the S1 stream is generated probabilistically, i.e., the number of primitives per scenario is based on a random number generator (in addition, the selection of primitives for a scenario is probabilistic, but the selection process is weighted by the i=0 sensitivity test cost ranking, i.e., the lower cost primitives would have a higher probability of being selected for a scenario); and 3) there is a fixed number of scenarios per iteration, which is set by the user in the Rules file. In the example shown in FIG. 8, four scenarios are run during each iteration. The scenarios are also of arbitrary complexity per iteration (i.e., scenario complexity refers to the number of primitives combined to form the scenario), whereas the scenario S1 stream in FIG. 4 grows in complexity as the iteration count increases. The user would also specify the maximum number of iterations and/or a convergence criteria in the Rules file.

Other variants on these control algorithms can also be developed. For example, a more conventional genetic algorithm could be employed that removes the i=0 sensitivity test. A swarm algorithm that removes the concept of iterations could also be developed. Gradient descent processes are also possibilities.

4.4 Reusing Synthesis Data by Overlapping Runs: In the interest of minimizing compute resources and disk space while maintaining quality of results, one method to reduce SynTunSys resource requirements is to employ the concept of "overlapping" or "collapsing" SynTunSys scenarios. Namely, each synthesis job within a SynTunSys tuning run described thus far has been a separate synthesis run. However, quite often many of the synthesis scenarios run the same code up to a certain point in the process and then diverge. The concept of overlapping runs is based on reusing portions of the synthesis runs that are common among the synthesis scenarios. Overlapping is enabled by the fact that there are multiple steps (program phases) in a synthesis run and most synthesis parameters are enacted only at a specific step. There are three overlapping operations, checkpointing, forking, and resuming, that can be applied to realize this concept, as FIG. 9 illustrates.

Figure 9:
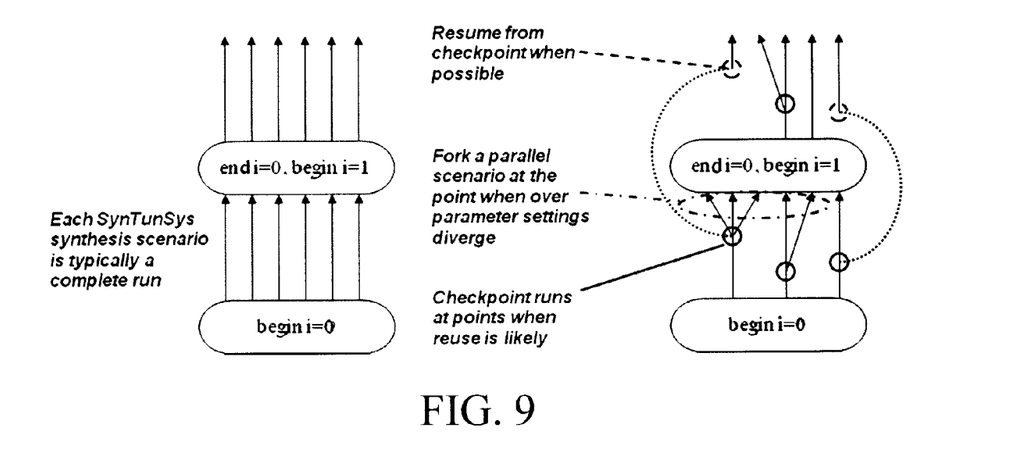
FIG. 9 is a diagram illustrating reusing synthesis data by overlapping runs according to an embodiment of the present invention.

For instance, with regard to the example shown in FIG. 9, instead of running six completely independent synthesis runs, the total amount of computation can be reduced by reusing portions of computation that are common among runs. In the example shown illustrated in FIG. 9, three of the six scenarios diverge during the first synthesis phase and are represented by independent jobs (lines in FIG. 9) at the beginning of i=0. During later phases additional parameters are acted upon and the "forking" of two or more scenarios occurs. Thus the common portions of the synthesis runs are reused up to this point. Prior to a fork point, the synthesis runs can be "checkpointed," which entails writing to disk each partially completed synthesis run as well as information to resume to the synthesis run(s). In FIG. 9, solid lines/circles are used to highlight checkpoints. Forking then resumes the now checkpointed scenario under a new scenario name, but modifies the parameters of interest to achieve a different result. The process of forking parallel scenarios at a point when parameter settings diverge is illustrated in FIG. 9 using a first hatching pattern of lines/circles. Checkpointed scenarios can also be resumed in later iterations by scenarios that overlap the checkpointed data. The process of resuming a checkpointed scenario is illustrated in FIG. 9 using a second hatching pattern of lines/circles. The result of overlapping scenarios is that common processing among parallel scenarios and iterations can be shared, which will reduce processing resources.

Figure 10:
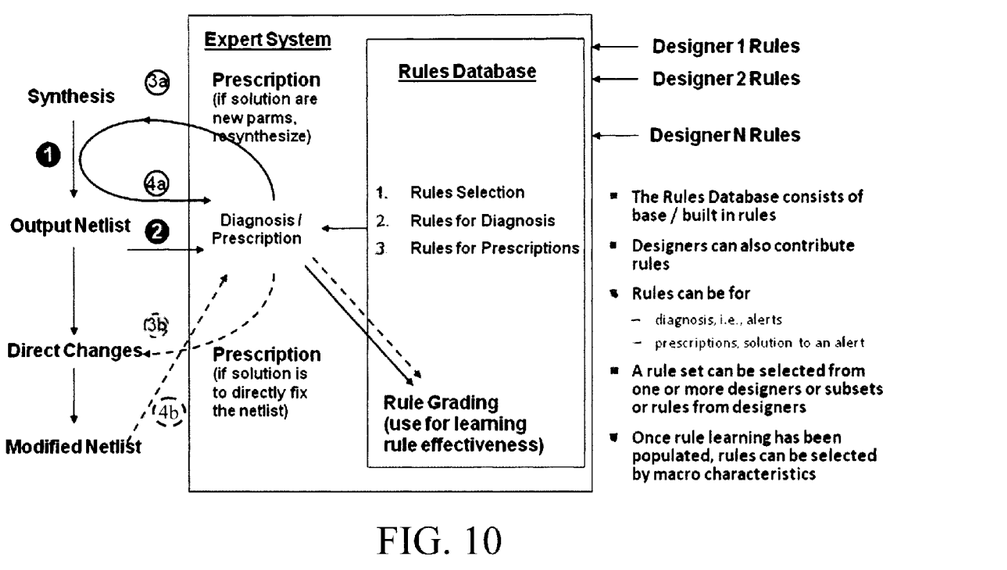
FIG. 10 is a diagram illustrating an overview of the present synthesis expert system according to an embodiment of the present invention.

5 Expert System Component (SynExtSys): FIG. 10 provides an overview of the expert system component, which is also referred to herein as the Synthesis Expert System or SynExtSys. The underlying motivation behind the SynExtSys embodiment is that certain rules of thumb to improve designs may be known by expert designers, but the search-based tuning process SynTunSys employs may not find the solution or may take a long time to "stumble upon" the solution. Thus in order to take advantage of existing design knowledge, the SynExtSys can either guide the SynTunSys search in the correct direction or directly change the synthesis output. In addition, experts may think differently on how to approach a problem. Each expert may have his/her own "bag of tricks," some of which may be better than others. SynExtSys allows designers to define their own rules for use in the system. The rules can be shared among designers using SynExtSys. The SynExtSys runs can use rules from all designers or a subset of designers. The sets of "designer rules" shown in FIG. 10 can also be simply groups of rules, e.g., timing improvement rules, power reduction rules, etc. rather than literally rules from different designers. The rules are generally small segments of code that are run against output of a synthesis job.

As shown in FIG. 10, the process begins by analyzing the output of a synthesis run (step 2 in FIG. 10, which corresponds to the process after step 3 in FIG. 3, i.e., collect results). As with other expert systems, the SynExtSys process employs a diagnosis and prescription model. The user selects which set of rules should be used in the diagnosis. The rules come in two types: 1) diagnostic rules, which look at potential problems or opportunities to improve the synthesis run, and 2) prescription rules, which are the solutions to the diagnosed problems. There are times when a user may want to run using only diagnostic rules, but not employ the prescription rules. Likewise, some diagnostic rules may not yet have corresponding prescription rules, but it would still be helpful to the user to know a diagnosis was triggered.

Figure 11:
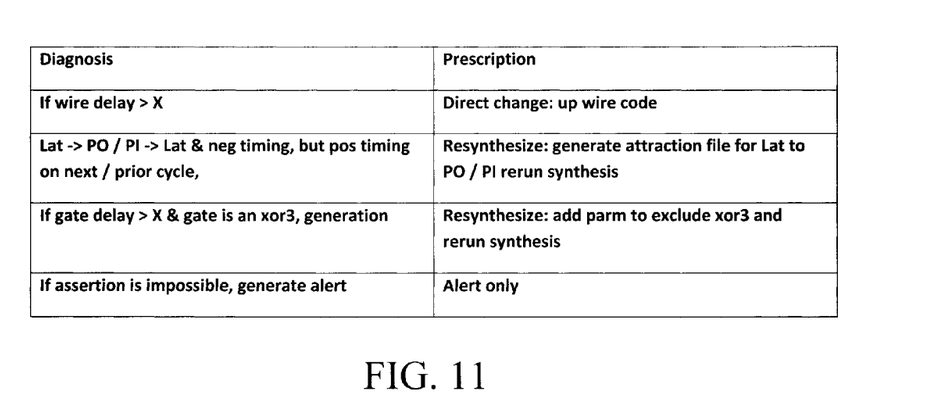
FIG. 11 is a diagram illustrating several exemplary diagnosis and prescription rule pairs according to an embodiment of the present invention.

For each diagnostic rule, the rule is run and if an alert is triggered, i.e., the rule determines some improvement can be made in the design, it logs a message to the user and into the rules archive. If a corresponding prescriptive rule is triggered then one of two forms of action can be taken: 1) the prescription can suggest new parameters for synthesis, as in path 3a, and the output of a new synthesis run is analyzed, as in path 4a of FIG. 10—thereby guiding the SynTunSys search in the correct direction; or 2) the prescription can directly change the output of the existing synthesis result, as in path 3b and 4b. After each prescription, the design is reanalyzed and the results of the analysis are logged in the archive. Thus over time rules can be judged in terms of effectiveness, which can be helpful in rules selection for future runs. FIG. 11 shows a few examples of diagnosis and prescription rule pairs.

Figure 12:
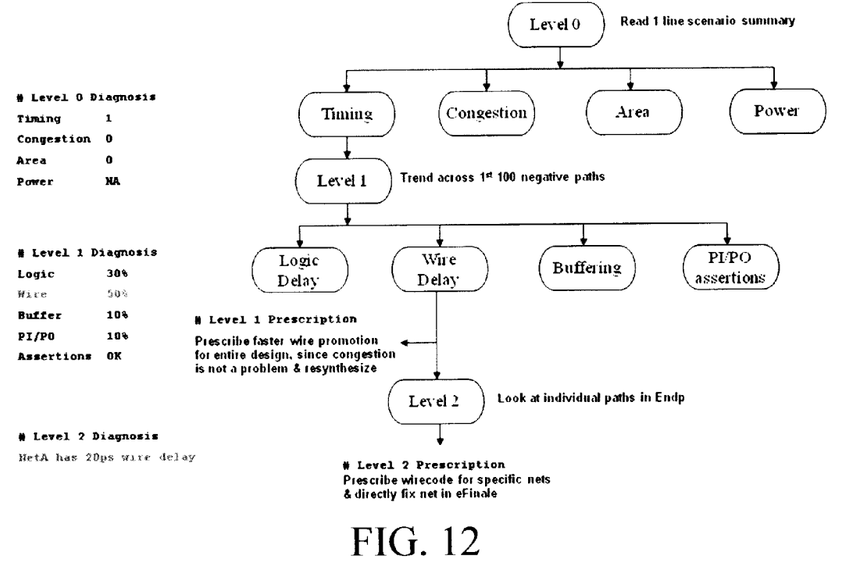
FIG. 12 is a diagram illustrating a potential hierarchical framework for diagnostic rules according to an embodiment of the present invention.

Finally, FIG. 12 shows a potential hierarchical framework for diagnostic rules. The framework provides a tree of common analysis steps. The idea here is that there is a hierarchical diagnosis process, i.e., if a problem at level 0 is detected, a deeper investigation is launched. However, if a problem is not detected at level 0, no deeper investigation is needed. Thus new rules can simply tap into or extend an existing framework. The example shows the tree traversal for a design that is diagnosed to have a timing problem related to wire delay. There are then two potential prescriptions suggested as a solution.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
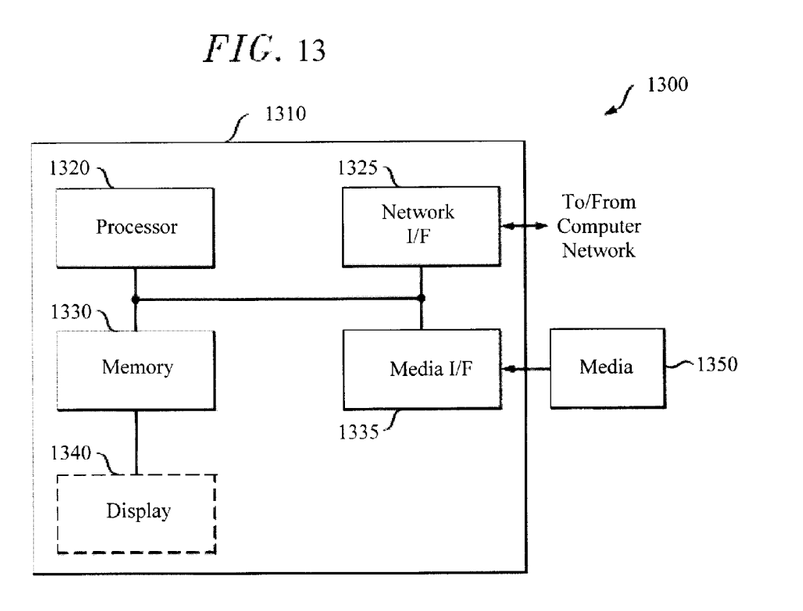
FIG. 13 is a diagram illustrating an exemplary apparatus for performing one or more of the methodologies presented herein according to an embodiment of the present invention.

Turning now to FIG. 13, a block diagram is shown of an apparatus 1300 for implementing one or more of the methodologies presented herein. By way of example only, apparatus 1300 can be configured to implement one or more of the steps of methodology 100 of FIG. 1 for tuning input parameters to a synthesis program. In one exemplary embodiment, apparatus 1300 is configured to run the present synthesis tuning system (SynTunSys).

Apparatus 1300 comprises a computer system 1310 and removable media 1350. Computer system 1310 comprises a processor device 1320, a network interface 1325, a memory 1330, a media interface 1335 and an optional display 1340. Network interface 1325 allows computer system 1310 to connect to a network, while media interface 1335 allows computer system 1310 to interact with media, such as a hard drive or removable media 1350.

Processor device 1320 can be configured to implement the methods, steps, and functions disclosed herein. The memory 1330 could be distributed or local and the processor device 1320 could be distributed or singular. The memory 1330 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1320. With this definition, information on a network, accessible through network interface 1325, is still within memory 1330 because the processor device 1320 can retrieve the information from the network. It should be noted that each distributed processor that makes up processor device 1320 generally contains its own addressable memory space. It should also be noted that some or all of computer system 1310 can be incorporated into an application-specific or general-use integrated circuit.

Optional display 1340 is any type of display suitable for interacting with a human user of apparatus 1300. Generally, display 1340 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for tuning input parameters to a synthesis program, the method comprising the steps of:
 (a) selecting a subset of parameter settings for the synthesis program based on a tuning optimization cost function;
 (b) individually running, using a processor device, synthesis jobs in parallel for each of the parameter settings in the subset;
 (c) analyzing, using the processor device, results from a current iteration and prior iterations, if any, using the tuning optimization cost function;
 (d) using the results from the current iteration and the prior iterations, if any, to create, using the processor device, combinations of the parameter settings;
 (e) running, using the processor device, synthesis jobs in parallel for the combinations of the parameter settings in a next iteration; and
 (f) repeating the steps (c)-(e) for one or more additional iterations or until an exit criteria has been met, wherein the synthesis program is a circuit synthesis program and the parameter settings are circuit synthesis parameter settings that are implemented in manufacturing integrated circuits, and wherein the exit criteria comprises one or more of: i) a predetermined number of iterations have been performed and ii) an iteration fails to improve results from one or more previous iterations.

2. The method of claim 1, wherein the tuning optimization cost function represents multiple design metrics with a single cost number.

3. The method of claim 1, wherein the tuning optimization cost function is expressed as a weighted sum of the design metrics.

4. The method of claim 1, wherein the step (c) of analyzing the results is performed after either i) all of the synthesis jobs in the step (b) have completed, 2) a user-specified percentage of the synthesis jobs in the step (b) have completed, or 3) a predetermined time limit is reached.

5. The method of claim 1, wherein the step (c) of analyzing the results comprises the step of:
ranking the results, based on the tuning optimization cost function, from a lowest cost, best result, to a highest cost, worst result.

6. The method of claim 1, wherein one or more of the parameter settings yield results a top N cost ranked of which, based on the tuning optimization cost function, are placed in a survivor set, and wherein the combinations of the parameter settings are created by combining each of the parameter settings in the survivor set with exactly one other of the parameter settings in the survivor set.

7. The method of claim 6, wherein user input influences which of the results are placed in the survivor set.

8. The method of claim 6, wherein the combinations of the parameter settings are created using formula-based guesses by either i) combining all of the parameter settings in the survivor set, or ii) combining N lowest cost parameter settings, or iii) combining all parameter settings that lower cost below a certain predetermined amount.

9. The method of claim 1, further comprising the step of:
(g) maintaining an archive of historical data in which the results are stored.

10. The method of claim 9, further comprising the steps of:
using the results to search the historical data in the archive to create the combinations of the parameter settings.

11. The method of claim 10, further comprising the steps of:
using the results as a clustering signature to cluster the historical data in the archive.

12. The method of claim 1, further comprising the step of:
(h) using designer rules from one or more users to either 1) suggest new synthesis parameters or 2) directly change synthesis output.

13. The method of claim 1, further comprising the step of:
(i) reusing portions of synthesis jobs from one or more prior iterations that are common to at least one of the additional iterations.

14. An apparatus for tuning input parameters to a synthesis program, the apparatus comprising:
a memory; and
at least one processor device, coupled to the memory, operative to:
(a) select a subset of parameter settings for the synthesis program based on a tuning optimization cost function;
(b) individually run synthesis jobs in parallel for each of the parameter settings in the subset;
(c) analyze results from a current iteration and prior iterations, if any, using the tuning optimization cost function;
(d) use the results from the current iteration and the prior iterations, if any, to create combinations of the parameter settings;
(e) run synthesis jobs in parallel for the combinations of the parameter settings in a next iteration; and
(f) repeat the steps (c)-(e) for one or more additional iterations or until an exit criteria has been met, wherein the synthesis program is a circuit synthesis program and the parameter settings are circuit synthesis parameter settings that are implemented in manufacturing integrated circuits, and wherein the exit criteria comprises one or more of: i) a predetermined number of iterations have been performed and ii) an iteration fails to improve results from one or more previous iterations.

15. The apparatus of claim 14, wherein the step of analyzing the results comprises the step of:
ranking the results, based on the tuning optimization cost function, from a lowest cost, best result, to a highest cost, worst result.

16. A computer program product for tuning input parameters to a synthesis program, the computer program product comprising a computer readable storage medium having program instructions embodied therewith, the program instructions executable by a computer to cause the computer to:
(a) select a subset of parameter settings for the synthesis program based on a tuning optimization cost function;
(b) individually run synthesis jobs in parallel for each of the parameter settings in the subset;
(c) analyze results from a current iteration and prior iterations, if any, using the tuning optimization cost function;
(d) use the results from current iteration and the prior iterations, if any, to create combinations of the parameter settings;
(e) run synthesis jobs in parallel for the combinations of the parameter settings in a next iteration; and
(f) repeat the steps (c)-(e) for one or more additional iterations or until an exit criteria has been met, wherein the synthesis program is a circuit synthesis program and the parameter settings are circuit synthesis parameter settings that are implemented in manufacturing integrated circuits, and wherein the exit criteria comprises one or more of: i) a predetermined number of iterations have been performed and ii) an iteration fails to improve results from one or more previous iterations.

* * * * *